United States Patent [19]

Fleagle

[11] 3,911,392
[45] Oct. 7, 1975

[54] FAILURE/MALFUNCTION WARNING CIRCUIT FOR WHEEL SLIP CONTROL SYSTEMS

[75] Inventor: Joseph E. Fleagle, Overland, Mo.

[73] Assignee: Wagner Electric Corporation, Parsippany, N.J.

[22] Filed: Sept. 13, 1974

[21] Appl. No.: 505,734

Related U.S. Application Data

[63] Continuation of Ser. No. 346,267, March 30, 1973, abandoned.

[52] U.S. Cl. ............... 340/52 B; 317/5; 317/16; 303/21 AF
[51] Int. Cl.² ........................................... B60T 8/00
[58] Field of Search ............ 340/52 R, 52 B, 53, 54, 340/62, 263; 317/5, 16; 307/115, 218; 303/21 AF; 224/77 M

[56] References Cited
UNITED STATES PATENTS

| | | |
|---|---|---|
| 3,556,611 | 1/1971 | Howard .................................. 303/21 |
| 3,740,103 | 6/1973 | Sweet et al. ..................... 303/21 EB |
| 3,759,582 | 9/1973 | Ohta et al. ....................... 303/21 AF |
| 3,822,921 | 7/1974 | Jones ................................ 303/21 BE |
| 3,838,891 | 10/1974 | Hamelin ........................... 303/21 AF |
| 3,861,755 | 1/1975 | Taylor ............................. 303/21 AF |

*Primary Examiner*—John W. Caldwell
*Assistant Examiner*—Joseph E. Nowicki
*Attorney, Agent, or Firm*—Eyre, Mann & Lucas

[57] ABSTRACT

A warning circuit with an audio and/or visual warning indicator is provided in a wheel slip control system for signalling a malfunction or failure in the system. The warning circuit comprises a logic circuit connected to monitor at least one voltage logic level in at least one pre-selected slip control circuit. The logic circuit generally performs the "inclusive OR" function. The warning indicator is connected to the logic circuit and is also energized by the logic circuit.

8 Claims, 3 Drawing Figures

FAILURE/MALFUNCTION WARNING CIRCUIT FOR WHEEL SLIP CONTROL SYSTEMS

CROSS REFERENCE TO RELATED APPLICATIONS

The present application is a continuation of application Ser. No. 346,267 bearing the same title and filed on Mar. 30, 1973 and now abandoned.

The system disclosed herein can advantageously be used with the wheel-slip control system disclosed and claimed in U.S. Pat. No. 3,827,760 issued on Aug. 6, 1974 upon application Ser. No. 218,378 entitled WHEEL SLIP CONTROL SYSTEM FOR AUTOMOTIVE VEHICLES AND THE LIKE filed on Jan. 17, 1972 in the name of Joseph E. Fleagel.

BACKGROUND OF THE INVENTION

Wheel slip control (anti-skid) systems such as that described in application Ser. No. 218,378 feature automatic slip control of braked wheels to provide effective vehicle stopping while preventing skidding. These prior art systems intermittantly reduce brake fluid pressure when the wheel decleration exceeds a maximum level which is indicative of imminent wheel skidding. While the brake fluid pressure is thus reduced, it can not be increased or maintained by the vehicle operator. Of course, the vehicle operator is free to further reduce the brake fluid pressure at any time. When the system automatically reduces pressure, it may be said that braking control is intermittantly transferred from the operator to the system. Thus, with this knowledge, the vehicle operator will normally attempt to maintain or increase brake fluid pressure during a stop and rely on the control system to reduce pressure when necessary to avert skidding.

If the control system is inoperative or defective, and the vehicle operator is ignorant of this fact, then he may proceed to apply brake pressure without regard to road conditions, relying on the control system to compensate for road conditions. Such action may induce skidding and, therefore, it is highly advisable to indicate to the vehicle operator whether the control system is operational.

In many patented prior art control systems, separate slip control circuits are provided for controlling braked wheels independent of each other or independent of wheels on different axles; and when a malfunction or failure occurs, the power to the particular circuit having the malfunction or failure, or the power to all circuits is interrupted. Interruption of power to a slip control circuit will prevent control of brake fluid pressure by that circuit. The prior art, however, does not disclose circuits for detecting the power interruption and transmission of this fact to the vehicle operator.

Of the various prior art patents which do describe warning circuits for use with anti-skid systems, none disclose a circuit for detecting the interruption of power but rather disclose complex analog circuits for threshold detecting.

SUMMARY OF THE INVENTION

The present invention is embodied in and carried out by a digital logic circuit which simultaneously detects the interruption of power to any one or more of a plurality of slip control circuits. Since voltage sources are most commonly used to supply power, an interruption of power will manifest itself in a loss of voltage. More particularly, therefore, the logic circuit detects the presence or absence of at least one voltage logic level in at least one pre-selected slip-control circuit in a slip-control system. Each input of the logic circuit is connected to a voltage input to a particular slip control circuit where an interruption of power, manifested by a loss of voltage, will be indicative of a control malfunction or failure. The interruption of power and resultant loss of voltage may be caused within the slip control system by connecting the power source feeding the particular slip control circuit input to a switch, one end of which is grounded, through a circuit interruptor such as a fuse or circuit breaker. The switch may be controlled by the slip control system, and when a malfunction or failure occurs, the switch is caused to short the power source to ground through the circuit interruptor to thereby open the circuit interruptor and disconnect the power source from the slip control circuit input.

The output of the logic circuit is connected to a warning indicator which may be energized by operation of the logic circuit.

BRIEF DESCRIPTION OF THE DRAWING

The present invention may be better understood by reading the written description thereof with reference to the accompanying drawing, of which.

DETAILED DESCRIPTION OF THE PREFERRED EMBODIMENTS

For purposes of illustration, the voltage level supplied by the power source, will be defined as a digital logic "1", or "high", and a "floating" voltage level or an essentially ground potential level will be defined as a digital logic "0" or "low".

Figure 1:
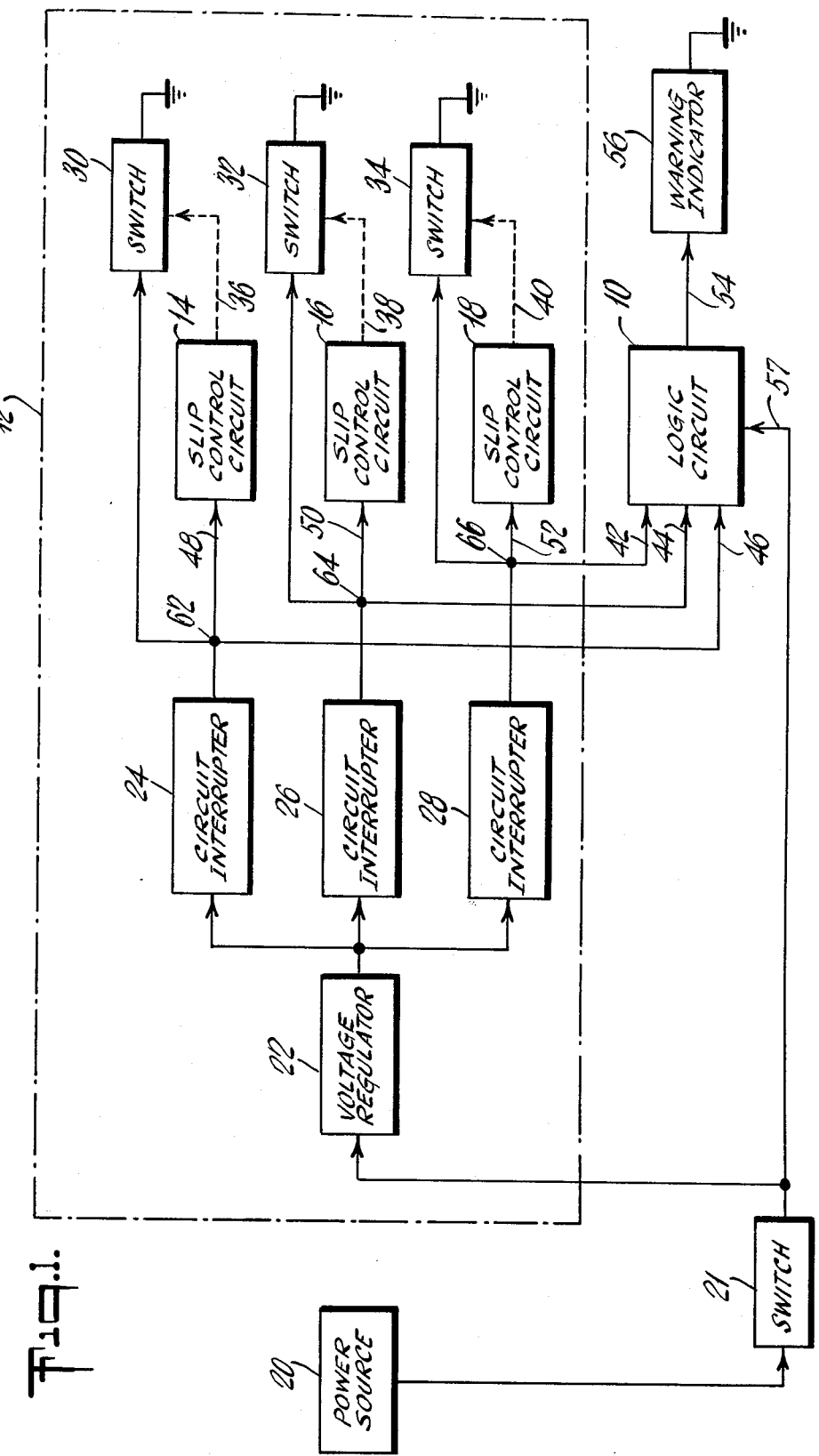
FIG. 1 is a block diagram illustrating generally the electrical interconnections of the preferred embodiment of the present invention to a slip control system.

Referring to the block diagram of FIG. 1, where arrow-heads indicate inputs to the respective blocks, connection is shown of a logic circuit 10 to a slip control system 12. The slip control system 12 comprises a plurality of separate slip control circuits 14, 16, and 18, controlling independently for example three wheels (not shown), or the wheels on three sets of axles (not shown). Power is supplied to the slip control circuits 14, 16, and 18 from power source 20, which may be a battery, or a generator or alternator with conventional elements to provide a substantially D.C. voltage. A switch 21, which may be an ignition switch or relay, or both, may be interposed between voltage regulator 22 and the power source 20. Power is then supplied serially from power source 20, through switch 21 and voltage regulator 22, and in parallel through interruptors 24, 26, and 28, respectively. The inputs to switches 30, 32, and 34 are connected to the outputs of circuit interruptors 24, 26, and 28, respectively, and the output of each of these switches is connected to ground. Dotted lines 36, 38, and 40 indicate that switches 30, 32, and 34 are controlled by slip control circuits 14, 16, and 18, respectively. The inputs 42, 44, and 46 of logic circuit 10 are connected to the voltage inputs 48, 50, and 52, respectively, to slip control circuits 14, 16 and 18, respectively, at a point after the voltage has passed through the respective circuit interruptor. Electrically these points of connection are respectively the same at which switches 30, 32, and 34 are connected. The power output 54 of the logic circuit 10 is connected to warning indicator 56 and the output of warning indicator 56 is grounded. Power is supplied to logic circuit power input 57 through switch 21 from power source 20; and in turn, power is supplied to energize the warning indicator 56 by the logic circuit 10 when the appropriate input conditions to the logic circuit 10 are present. The logic circuit 10 generally performs the function of inclusive OR as shown in Truth Table I.

Table I

| INPUTS | | | OUTPUT |
|---|---|---|---|
| 42 | 44 | 46 | 54 |
| 1 | 1 | 1 | 0 |
| 1 | 1 | 0 | 1 |
| 1 | 0 | 1 | 1 |
| 1 | 0 | 0 | 1 |
| 0 | 1 | 1 | 1 |
| 0 | 1 | 0 | 1 |
| 0 | 0 | 1 | 1 |
| 0 | 0 | 0 | 1 |

Operation of the circuit is as follows. Under normal operating conditions, voltage is supplied to the slip control circuits 14, 16, 18 from the power source 20 through switch 21, voltage regulator 22 and the circuit interruptors 24, 26, 28. Thus, the regulated voltage level, a logic 1, is present at slip control circuit inputs 48, 50 and 52 and at logic circuit inputs 42, 44, and 46. The power output 54 of the logic circuit 10 is normally a logic 0 when all its inputs are a logic 1. However, when the logic level at any or all inputs to the logic circuit 10 changes to a logic 0, the power output 54 changes to a logic 1. A logic 1 at the logic circuit power output 54 supplies voltage to the warning indicator 56 to energize it.

The change in logic level at any or all inputs 42, 44, 46 of the logic circuit 10 is caused by the closing of any or all of switches 30, 32, 34, respectively, thereby shorting the voltage which is supplied to any or all of the slip control circuits 14, 16, 18 to ground. This shorting opens the respective circuit interruptor 24, 26, 28 and at the same time connects the respective logic circuit input 42, 44, 46 and slip control circuit voltage input 48, 50, 52 to ground or a logic level 0. The switches 30, 32, and 34 are controlled by the slip control circuits 14, 16, and 18, respectively, which close the respective switch upon detection of a malfunction or failure condition.

Figure 2:
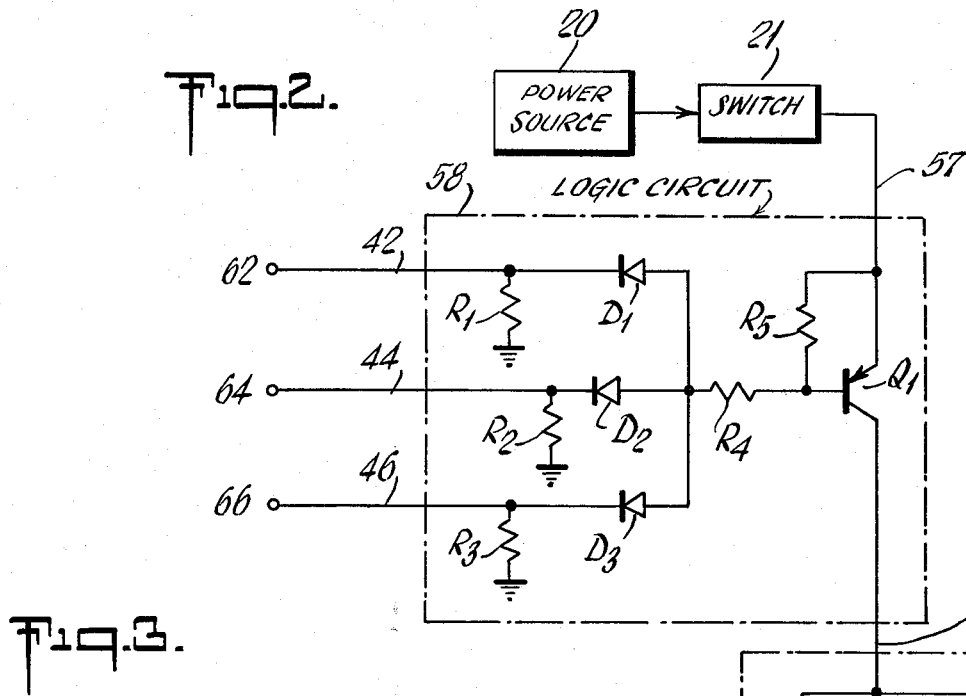
FIG. 2 is a schematic wiring diagram of the logic circuit and warning indicator of FIG. 1.

Referring to FIG. 2, a schematic diagram of a logic circuit 58 and a warning indicator 60 are shown. The inputs 42, 44, and 46 of the logic circuit are connected to the slip control system 12 which is shown in dotted lines in FIG. 1 at points 62, 64, and 66, respectively. Connected to logic circuit inputs 42, 44, and 46, respectively, are the cathodes of diodes D1, D2, and D3, and one end of biasing resistors R1, R2, and R3. The other end of each of resistors R1, R2, and R3, is connected to ground. The anodes of diodes D1, D2, and D3 are connected to one end of limiting resistor R4, while the other end of resistor R4 is connected to the base of transistor Q1. Biasing resistor R5 is connected between the base and emitter of transistor Q1. The emitter of transistor Q1 is connected to the power input 57 of logic circuit 58 which is connected to switch 21, which in turn is connected to power source 20; and the collector of transistor Q1 is connected to the power output 54 of logic circuit 58, which is connected to the warning indicator 60. The warning indicator is made up of a visual and audio indicator. Lamp 68 is connected in parallel with the series connection of thermal relay 70 and buzzer 72. The parallel connection is made between the logic circuit power output 54 and ground.

The operation of the logic circuit and warning indicator shown in FIG. 2 is in accordance with the truth table shown in Table I and is as follows. Logic circuit inputs 42, 44, and 46 are normally at a logic level 1 (switch 21 closed, switches 30, 32, and 34 open, and no malfunction or failure). Thereby a logic level 1 is present at the cathodes of diodes D1, D2, and D3, which are reversed-biased or insufficiently forward-biased to allow transistor Q1 to turn on. This is so because the current from the power source 20 through switch 21, the emitter-base junction of transistor Q1, resistor R4, diodes D1, D2, D3, and resistors R1, R2, R3, respectively, to ground is insufficient to forward-bias the emitter base junction of transistor Q1 enough to cause its collector-emitter junction to saturate. The emitter-collector junction of transistor Q1 is, therefore, essentially an open circuit, and opens the circuit between switch 21 and the logic circuit power output 54. Thus, the logic circuit output is floating and at a logic level 0. The values of resistors R1-R5 determine the minimum potential difference between the emitter of Q1 and the inputs 42, 44, and 46 of the logic circuit required to turn transistor Q1 on. In choosing these values, the range of voltages which are encompassed in a logic level 1 and logic level 0 must be considered. When any or all of inputs 42, 44, and 46 are at a logic level 0, (indicating that any or all of switches 30, 32, 34 have closed upon a failure or malfunction in any or all of slip control circuits 14, 16, 18 respectively) the potential difference between the emitter of transistor Q1 and ground through the respective diode or diodes and resistors is sufficient to force current through the emitter-base junction to saturate the emitter-collector junction and thereby turn transistor Q1 on. With the emitter-collector of transistor Q1 saturated, the voltage drop is low so that essentially all of the power source voltage, which is a logic level 1, is impressed across the warning indicator 60 at the logic circuit power output 54. The presence of the power source voltage at the warning indicator energizes it in conventional fashion. A thermal relay 70 is included so that the buzzer 72 will be deenergized a predetermined time after it is energized. The warning indicator will, of course, perform its function with only lamp 68, or buzzer 72, or without the thermal relay 70. Of course, when all logic circuit inputs return to logic level 1, the logic circuit output power 54 switches again to a logic level 0, extinguishing the warning indicator.

A parts list for use with a nominal power source voltage of 12 volts and a nominal regulated voltage output of 10 volts follows.

| Resistors | | Diodes | |
|---|---|---|---|
| R1 | 470 | D1 | IN914 |
| R2 | 470 | D2 | IN914 |
| R3 | 470 | D3 | IN914 |
| R4 | 470 | Transistors | |
| R5 | 4.7K | Q1 | D43C5 |

Figure 3:
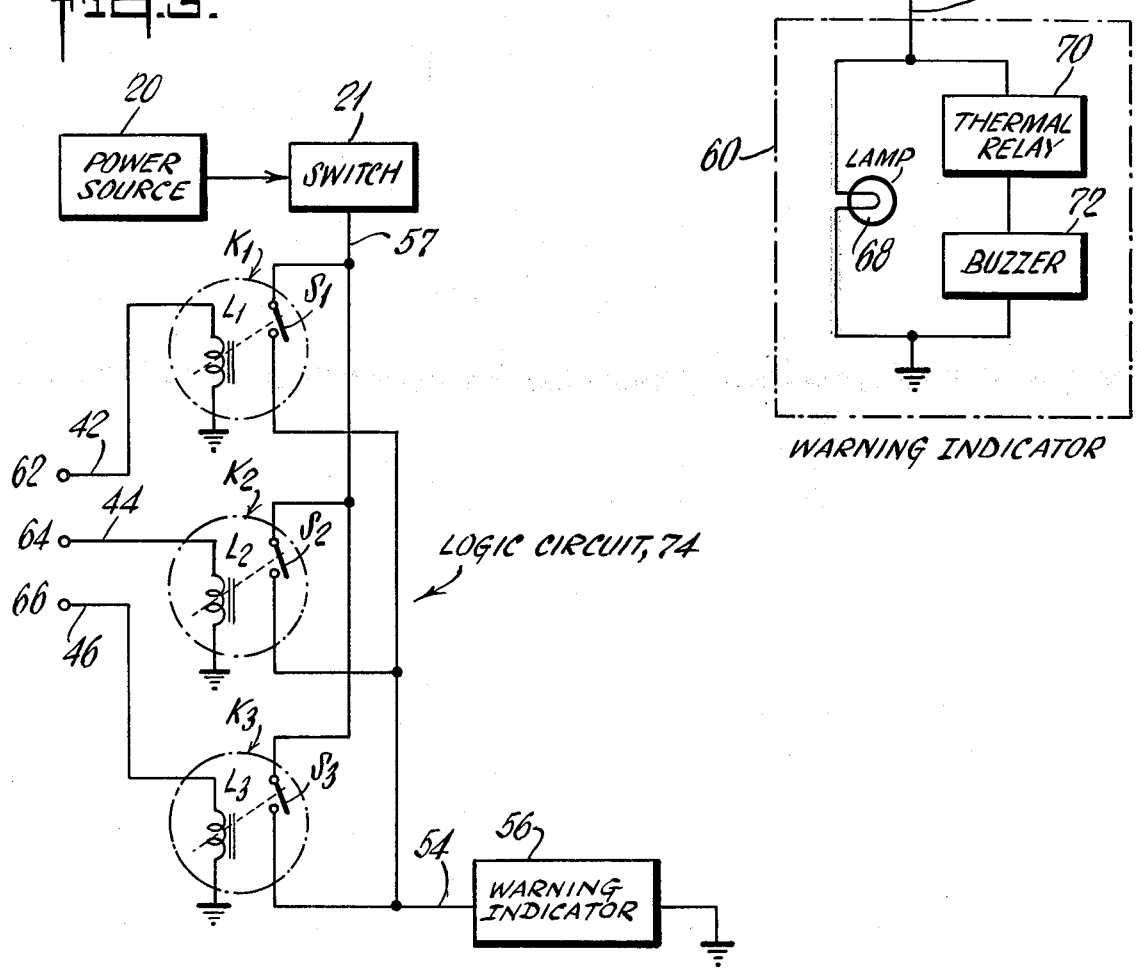
FIG. 3 is a schematic wiring diagram of another embodiment of the logic circuit of FIG. 1.

Referring now to FIG. 3, another embodiment of a logic circuit 74 is shown. Each input of the logic circuit 42, 44, and 46 is connected in the slip control system 12 shown in dotted lines in FIG. 1 at 62, 64, and 66, respectively. Each logic circuit input 42, 44, 46, is connected to an energizing coil L1, L2, L3, respectively, of relays k1, K2, K3, respectively. The other end of each energizing coil L1, L2, L3 is grounded. Each energizing coil L1, L2, L3 controls the opening and closing of the respective relay contacts, schematically shown as switches S1, S2, S3, respectively. Each switch opens and closes a parallel circuit between the logic circuit power input 57 (connected to switch 21) and the logic circuit output 54.

The logic circuit power output 54 is connected to the warning indicator 56, which is in turn connected to ground at its output.

The operation of the logic circuit 74 is in accordance with the truth table shown in Table I and is as follows. Logic circuit inputs 42, 44, and 46 are normally at a logic level 1 (switch 21 closed, switches 30, 32, and 34 open, and no malfunction or failure). Thereby, a logic level 1 is present at the energizing coils L1, L2, L3, energizing them. Relays K1, K2, and K3 are chosen so that their contacts are normally open when their coils are energized. Switches S1, S2, and S3 are thereby open and the circuit between switch 21 and the logic circuit is broken. As a result, the logic circuit output power 54 is floating or at a logic level 0. However, when any or all of the logic current inputs 42, 44, and 46 are at a logic level 0 (indicating that any or all of switches 30, 32, 34 have closed upon a failure or malfunction in any or all of slip control circuits 14, 16, 18; respectively), then the respective coil is de-energized and the respective relay contacts are closed providing a circuit path or paths between switch 21 and the logic circuit output power 54. Since switch 21 is connected to power source 20, the logic circuit output power 54 switches to a logic level 1. A logic level 1 at the input to the warning indicator 56 will energize it. Of course, when all logic circuit inputs are again at a logic level 1, the logic circuit output power 54 switches again to a logic level 0, extinguishing the warning indicator.

Although only two embodiments of a logic circuit have been shown, many others will be apparent to those skilled in the art. For example, the logic circuit may take the form of an integrated circuit in which a driving stage to energize the warning indicator may be included. Alternatively, an integrated circuit may be combined with an external driving element. Further, a slip control system can be designed in which a logic level 1 indicates failure or malfunction, in which case the logic circuits disclosed can be easily altered or new ones substituted to accommodate this. Such altered or new logic circuits may be described by the truth table in Table I or an inversion thereof.

In the logic circuit of FIG. 3, the relays may be changed so that the relay contacts are open when the relay coils are de-energized.

Additionally, the number of inputs to the logic circuit can be increased or decreased from three, three having been chosen merely for purposes of illustration.

The advantages of the present invention, as well as certain changes and modifications of the disclosed embodiments thereof, will be readily apparent to those skilled in the art. It is the Applicant's intention to cover all those changes and modifications which could be made to the embodiments of the invention herein chosen for the purposes of the disclosure without departing from the spirit and scope of the invention.

What is claimed is:
1. A slip control system for automotive vehicles, comprising:
   a. a plurality of slip control circuits each having a power input terminal;
   b. a plurality of means each connected between a power source and the power input terminal of an associated slip control circuit and each operative to interrupt power to said associated slip control circuit by disconnecting the power input terminal from power upon detection of a malfunction in the associated slip control circuit;
   c. a plurality of means each operative to connect an associated power input terminal to ground upon detection of a malfunction;
   d. logic means having a plurality of logic inputs each connected to the power input terminal of an associated slip control circuit and having an output, said logic means being operative to detect said interruption of power and ground connection and to provide a signal at said output in response thereto; and
   e. indicator means connected to said logic means output for indicating said power interruption and ground connection in response to said signal at said output.

2. The combination according to claim 1, wherein said logic means is operative to perform the "inclusive OR" logic function.

3. The combination according to claim 1, wherein said logic means comprises a plurality of diodes and a transistor having a control input terminal and power input and power output terminals, each of said plurality of diodes being connected at a first terminal thereof to an associated logic input of said logic means and at a second terminal thereof to said transfer control input terminal, each of said diodes alone or in any combination being operative to bias said transistor on in response to said power interruption and ground connection applied to the associated input.

4. The combination according to claim 3, wherein said logic means further comprises a power input and a power output, said transistor power input and output terminals being connected between said power input and power output and operative to switch power therebetween, said indicator means being connected between said logic means power output and ground.

5. The combination according to claim 3, wherein said logic means further comprises a plurality of bias resistors, and wherein an associated bias resistor is connected between each one of said plurality of logic inputs and ground, and wherein said second terminals of said plurality of diodes are connected to said control input terminal of said transistor through a common resistor, said power input terminal of said transistor being connected to said logic means power input, said power output terminal of said transistor being connected to said logic means output, and another of said plurality of bias resistors being connected between said transistor control input terminal and said power input terminal of said transistor.

6. The combination according to claim 5, wherein said first terminal of each of said plurality of diodes is the cathode and said second terminal of each of said plurality of diodes is the anode.

7. The combination according to claim 1, wherein said logic means comprises a plurality of electromechanical switches having an actuating portion and a switch portion which is controlled by said actuating portion, each one of said actuating portions being connected to an associated logic means input and operative to actuate the associated switch in response to said power interruption and ground connection applied to the associated input.

8. The combination according to claim 7 wherein said logic means further comprises a power input and a power output and wherein said electromechanical switches are connected in parallel between said power input and said power output, said indicator means being connected between said power output and ground, and each of said actuating portions of said plurality of electromechanical switches comprising a coil which is connected between an associated input and ground.

* * * * *